(12) United States Patent
Hardegger et al.

(10) Patent No.: US 8,542,348 B2
(45) Date of Patent: Sep. 24, 2013

(54) COLOR SENSOR INSENSITIVE TO DISTANCE VARIATIONS

(75) Inventors: Martin Hardegger, Sargans (CH); Reto Berner, Aarau (CH); Richard Galera, Nashua, NH (US); Suresh Nair, Amherst, NH (US); Carl Meinherz, Malans (CH); Craig Martin Brockman, Windham, NH (US); Elik I. Fooks, Lexington, MA (US); Manfred Norbert Stein, Graubuenden (CH); Robert M. Black, Bolton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 87 days.

(21) Appl. No.: 12/938,499

(22) Filed: Nov. 3, 2010

(65) Prior Publication Data
US 2012/0105823 A1 May 3, 2012

(51) Int. Cl.
*G01C 3/08* (2006.01)
(52) U.S. Cl.
USPC .......... 356/5.01; 356/3.01; 356/4.01; 356/5.1
(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 6,515,470 | B2 | 2/2003 | Suzuki et al. |
| 7,274,393 | B2 | 9/2007 | Acharya |
| 2005/0179912 | A1* | 8/2005 | Van Brocklin et al. ....... 356/519 |
| 2007/0046941 | A1* | 3/2007 | Mestha et al. ................. 356/402 |
| 2010/0026982 | A1* | 2/2010 | Kludas et al. ................ 356/4.01 |

FOREIGN PATENT DOCUMENTS

| EP | 1178333 A2 | 2/2002 |
| WO | 2005/072358 A2 | 8/2005 |

* cited by examiner

*Primary Examiner* — Luke Ratcliffe
(74) *Attorney, Agent, or Firm* — Turocy & Watson, LLP; William R. Walbrun; John M. Miller (57) ABSTRACT

A system for calibrating a color sensing pixel based upon the distance between the color sensing pixel and an object. The distance is determined by measuring the phase shift of electromagnetic radiation as reflected from the surface of the object compared with the wave profile of the electromagnetic radiation incident on the object surface. The color sensing pixel is associated with a Time-of-Flight (ToF) pixel which is employed to determine the distance of the color sensing pixel. The electromagnetic radiation can be from any part of the electromagnetic spectrum, in particular the infrared and visible light portions of the electromagnetic spectrum. The color sensing pixel and the ToF pixel can reside on the same semiconductor or on disparate semiconductors.

20 Claims, 10 Drawing Sheets

COLOR SENSOR INSENSITIVE TO DISTANCE VARIATIONS

TECHNICAL FIELD

The subject specification relates generally to solid state sensors and in particular to color determination/correction based upon distance measurement/determination.

BACKGROUND

A means for capturing an image digitally is an image sensor which converts an optical image to an electrical signal, as commonly employed in digital cameras and other imaging devices. Typical image sensors comprise a charge-coupled device (CCD) or a complimentary metal-oxide-semiconductor (CMOS) active-pixel sensor. A CCD is an analog device, when light strikes the individual photo sensors (pixels) comprising the image sensor the received light is held as an electric charge in each pixel. The charge in each pixel is read, converted to a voltage, and further converted to digital information from which a digital image can be created. With a CMOS sensor additional circuitry is employed to convert a voltage into digital data. Both CCD and CMOS systems operate utilizing poly-silicon gates, and have their advantages and disadvantages. Hybrid image sensors, scientific CMOS (sCMOS), are available that combine a CCD imaging substrate with a CMOS readout integrated circuit (ROICs).

By knowing the viewing distance between a color pixel and an object, it is possible to compile readings from a plurality of color pixels along with a distance measurement for each color pixel and thereby create a 3D image. Color determination can be affected by the distance between a color pixel and the color of an object in question. Further, the effect of distance on one particular portion of the electromagnetic spectrum can have a different effect with respect to another portion of the electromagnetic spectrum. For example, color readings made from the red light portion (e.g., about 650 nm) may be more affected by distance than readings made from the blue light portion (e.g., 475 nm). Accordingly, for color correction of an image, differing degrees of color correction may be required for readings taken from different portions of the electromagnetic spectrum.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

With the disclosed aspects presented herein, information regarding coloration of an object can be color-corrected based upon the viewing distance between a color sensing device (e.g., a pixel in a photosensor) and the object being viewed. A Time of Flight (ToF) sensor/pixel is associated with a pixel (e.g., a color pixel) receiving light from the object. Phase shift analysis of electromagnetic radiation received at the ToF sensor is performed and, accordingly, the distance from the ToF sensor (and accordingly the distance of the associated color pixel) to the object can be determined. By knowing the distance from the color pixel to the object, a color value generated by the color pixel can be corrected to a color value in accordance with the measured distance. Effectively, the color pixel is calibrated based upon the measured distance. A radiation source for the ToF sensor can be electromagnetic radiation, where, for example, the electromagnetic radiation can be from the infrared or visible light portions of the electromagnetic radiation spectrum.

A plurality of color pixel and ToF pixel arrangements are available. Color pixels and ToF pixels can be incorporated into the same image sensor. A chip can be manufactured comprising pixel groupings where pixels are created to perform color sensing (e.g., red, green, blue (RGB)) and other pixels are ToF pixels created to perform distance measuring. Alternatively, a plurality of chips can be manufactured whereby a number of the chips are color sensing chips while the other chips are manufactured as ToF sensors. Each pixel on a color sensing chip is associated with a pixel on a ToF sensor. In another aspect, color and distance sensing components can be combined on a single integrated circuit along with means for processing readings received from the color and distance sensing components.

In one aspect, a common radiation source can be employed to generate illumination for the color sensor as well as allowing distance measurements to be performed by the ToF sensor. In another aspect, the radiation source employed to perform ToF measurements is of a different part of the electromagnetic spectrum compared with a radiation source employed to illuminate the object and color sensing by a color pixel.

A ToF sensor operating in grayscale and producing grayscale images can be altered to produce color images, whereby such alteration can be performed using color filters which limit the wavelength of radiation incident on the ToF sensor, and comprising ToF pixel(s).

In another aspect, a single LED can be employed to illuminate an object and facilitate distance measurements, e.g., the LED emits white light. In another aspect a plurality of LEDs can be employed, where each LED emits electromagnetic radiation of a particular wavelength. In a further aspect, the radiation generated by the plurality of LEDs can be combine to produce illumination having a plurality of wavelengths, e.g., red LED, blue LED, green LED combined to form white light illumination.

In an aspect, calibration of a color pixel can be performed by employing look-up tables and/or algorithms which provide correlations between color, distance and color correction.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a microprocessor, a microcontroller, a chip, an integrated circuit, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Figure 1:
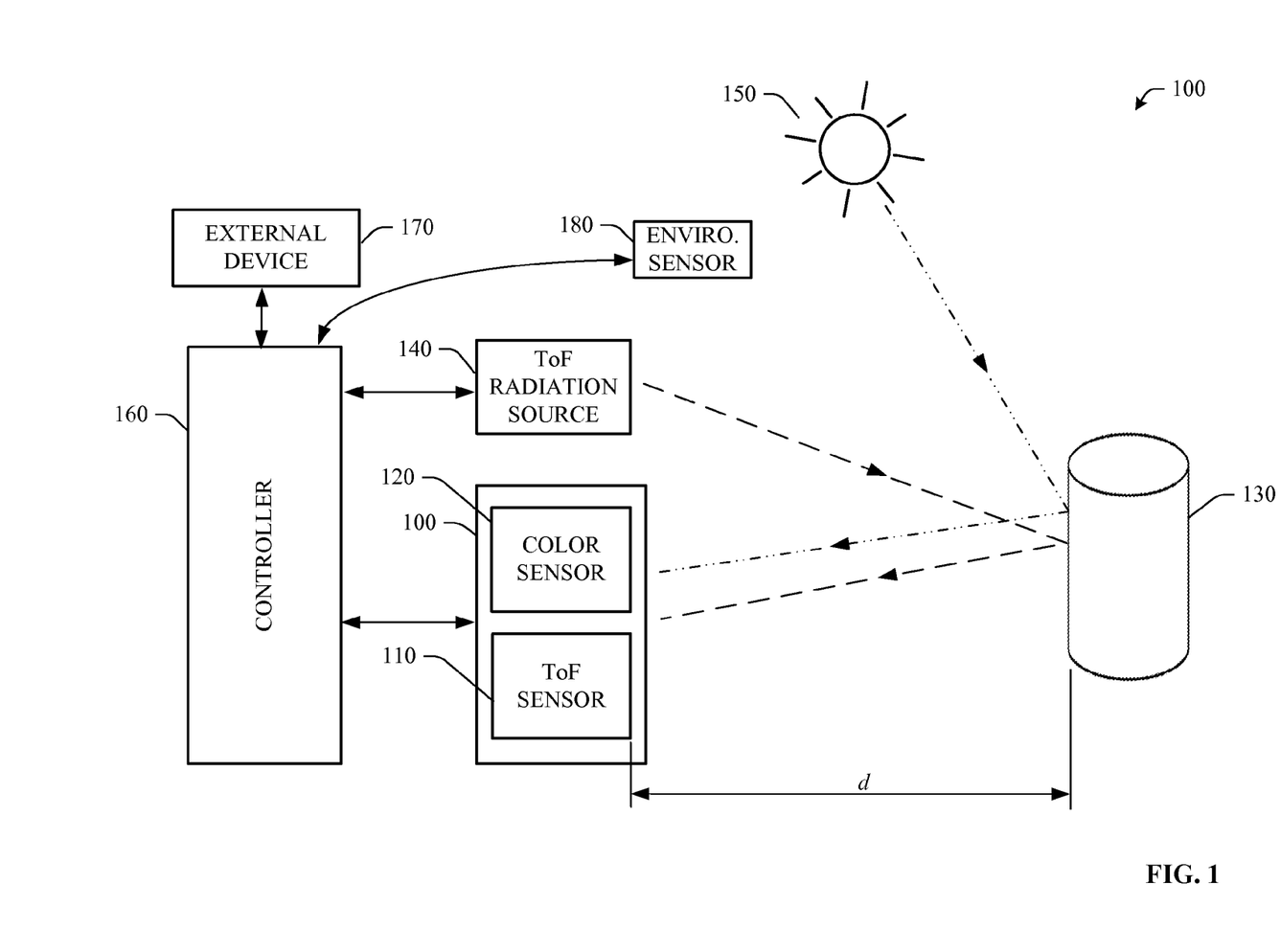
FIG. 1 illustrates a system for determining color-correction based upon object distance, in accordance with an aspect.

FIG. 1 illustrates system 100 for determining viewing distance to an object to facilitate sensor calibration and color sensing. An image sensor 100 comprises a Time of Flight (ToF) sensor 110 and a color sensor 120. The image sensor 100 receives radiation from respective ranges of the electromagnetic spectrum to facilitate operation of ToF sensor 110 and color sensor 120. A ToF radiation source 140 provides electromagnetic energy to facilitate operation of the ToF sensor 110, while a radiation source 150 provides electromagnetic energy to facilitate operation of the color sensor 120. Electromagnetic energy emitted from sources 140 and 150 is reflected from object 130 and respectively captured by ToF sensor 110 and color sensor 120. Controller 160 can control operation of the various components comprising system 100 (e.g., ToF sensor 110, color sensor 120, etc.) either on an individual basis or a combination of components, thereby enabling determination of distance d between object 130 and ToF sensor 110, and correction (as required) of the received color of object 130. Based upon measurements of distance d, controller 160 can make a determination regarding any required calibration of color sensor 120 and accordingly, "correction" of the received color of object 130. Such automatic calibration of color sensor 120 can negate the need for labor-intensive calibration procedures which may be required to ensure operation of a color sensor that does not adjust readings on account of sensor to object distance.

Further, the viewing distance of the color sensor 120, and any pixels it comprises, can be automatically adjusted based upon the refresh rate of the ToF sensor 110, and any ToF pixels comprising ToF sensor 110. Readings obtained from color sensor 120 and ToF sensor 110 can be utilized by controller 160 to generate a color corrected output (e.g., an image) which can be forwarded to an external device 170. The corrected output can include both color information and distance information for respective pixels thereby facilitating generation of a 3D image. External device 170 can provide means for display of an image generated from information received from the color sensor 120, from the ToF sensor 110, and any color correction effected by controller 160. External device 170 can further comprise means for data processing, where information associated with the color correction process (e.g., readings obtained by image sensor 100, Tof sensor 110, color sensor 120, etc.) can be provided to the external device for subsequent processing.

Further, to take into account the environmental circumstances in which system 100 is operating an environmental sensor 180 can be utilized to obtain information regarding the environment of operation. For example, environmental sensor 180 can detect that the environment of operation has been negatively affected by atmospheric particulates (e.g., smoke) and the output of radiation source 150 or ToF radiation source 140 requires according adjustment, e.g., by controller 160.

Figure 9:
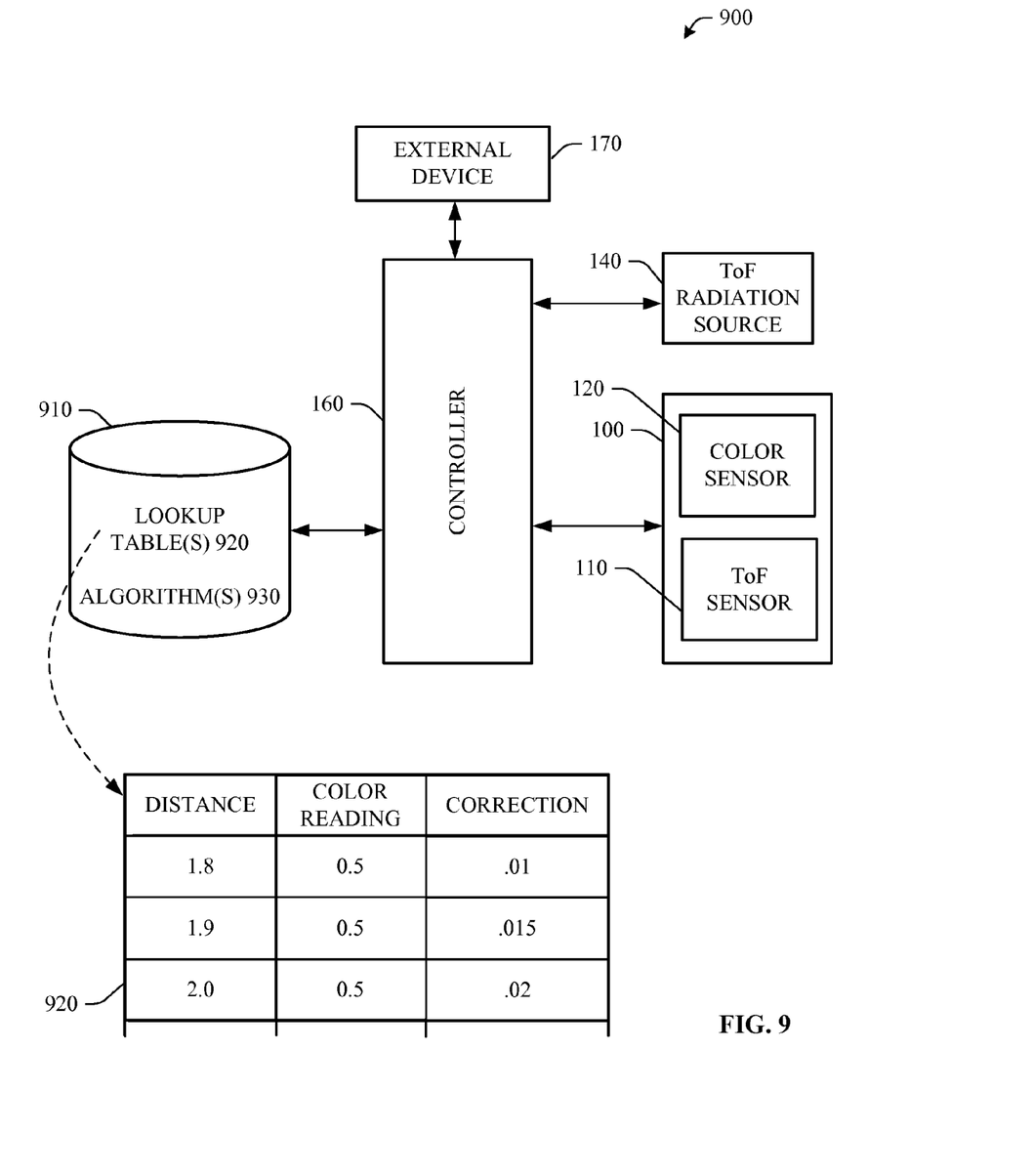
FIG. 9 illustrates a system for determining color-correction based upon object distance, in accordance with an aspect.

It is to be appreciated that while ToF sensor 110 and color sensor 120 are shown as being incorporated into a common image sensor 100 component, the invention is not so limited, where ToF sensor 110 and color sensor 120 can be combined to form a common image sensor 110, or ToF sensor 110 and color sensor 120 operate in isolation. Embodiments of such combination/isolation are presented infra. It is to be further appreciated that while various components comprising system 100 are shown as individual devices (e.g., image sensor 100, ToF sensor 110, color sensor 120, ToF radiation source 140, radiation source 150, controller 160, external device 170, and storage 910 (ref. FIG. 9), etc.) the various aspects, as presented herein, are not so limited and one or more components comprising system 100 can be housed in a common housing, e.g., image sensor 100, ToF sensor 110, color sensor 120, ToF radiation source 140, controller 160, and storage 710 are integrated into a single housing or a single chip, microcontroller, integrated circuit, and the like. Further, while external device 170 is shown as being external to controller 160, the two components can be combined in a common housing, where, for example, the external device 170 is a display device facilitating display of a color corrected image, color data, distance data, etc., as generated by controller 160 and any associated components.

It is to be appreciated that while ToF radiation source 140 and radiation source 150 may utilize radiation from different portions of the electromagnetic spectrum, e.g., ToF radiation source 140 utilizes IR radiation and radiation source 150 utilizes visible light, a common radiation can be employed with the various aspects presented herein. For example, ToF radiation source 140 and radiation source 150 can both employ radiation having a common wavelength such as visible red light. A radiation source 150 can employ red visible light to illuminate the object and the ToF radiation source 140 can utilize red visible light from which phase shift measurements and, accordingly, distance measurements can be determined, as described below. Accordingly, in another aspect, an image generated using the common radiation source can be monochromatic. Further, in another aspect, the ToF radiation source 140 and/or radiation source 150 can contain a combined light operating concurrently, (e.g. red, green, and blue LEDs combining to produce white light) which is modulated and utilized for distance measurement (e.g., by ToF sensor 110) and color sensing (e.g., color sensor 120) simultaneously. In a further aspect, ToF radiation source 140 and/or radiation source 150 can be a laser, or similar mechanism for emitting electromagnetic radiation, wherein ToF sensor 110 and/or color sensor 120 have suitable functionality to perform respective distance measurement/image generation using a laser source.

Figure 2:
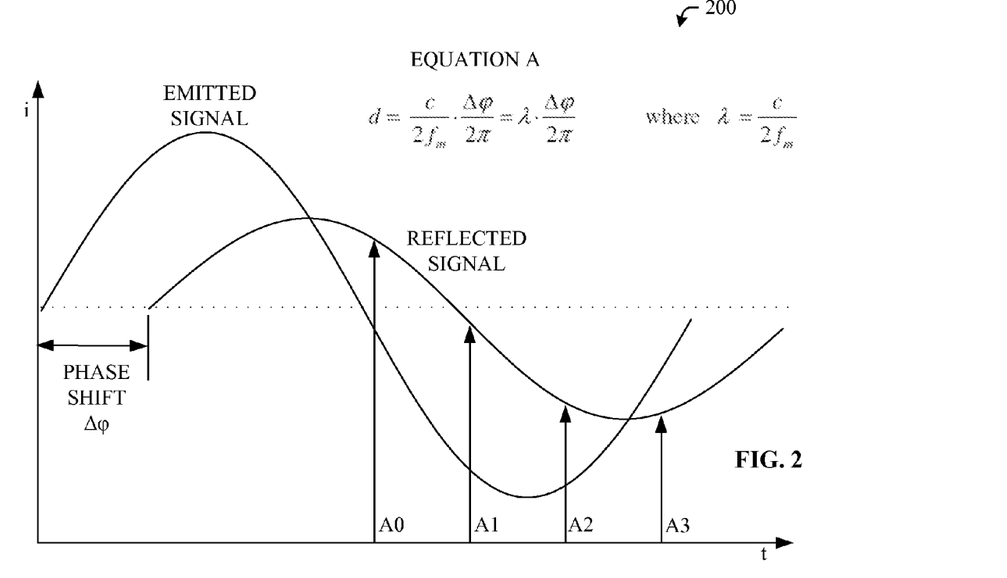
FIG. 2 illustrates a measurement process employing electromagnetic radiation to determine position of an object, in accordance with an aspect.

For the purpose of understanding the various aspects presented herein, operation of the ToF sensor 110 is now briefly described. ToF sensor 110 has been developed for application in the field of distance measurement to facilitate such operations as detection of persons, objects, obstacles, etc., as well as measuring position, distance, dimensions, etc. As mentioned above, a ToF sensor 110 operates in conjunction with a ToF radiation source 140. ToF radiation source 140 generates radiation of a specific part of the electromagnetic spectrum and, based upon the wavelength of the radiation, the distance an object 130 resides from the ToF radiation source 140 and a ToF sensor 110 can be determined. In one aspect, the ToF radiation source 140 emits light from the infrared (IR) portion of the electromagnetic spectrum. With reference to FIG. 2, ToF technology is based upon determining a phase shift Asp between an signal emitted from the ToF radiation source 140 and a signal reflected from object 130 received at the ToF sensor 110. From the determined phase shift Asp, the distance d, between object 130 and ToF sensor 110, can be determined. Where with reference to Equation A, d=distance, c=speed of light, $f_m$=modulation frequency (which is a function of the radiated power of an emitter) and $\Delta\phi$=arctan((A3−A1)/(A0−A2)) where positions A0, A1, A2, and A3 are at fixed durations of time It is to be appreciated that while FIG. 2 presents ToF technology based upon determination of phase shift $\Delta\phi$, other principles of ToF technologies are available, for example, pulse metering where a pulse is transmitted and the time-to-receive is measured.

Figure 3:
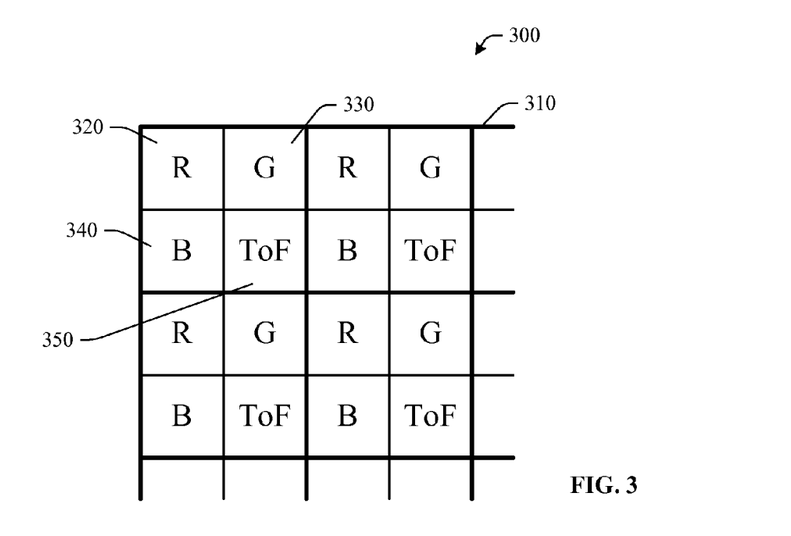
FIG. 3 illustrates a system for color correcting an image based upon distance measurements provided by associated ToF sensor(s), in accordance with an aspect.

As previously mentioned, ToF sensor 110 and color sensor 120 can operate in isolation or in combination. Various embodiments of such operations are presented. In one aspect a ToF sensor 110 can be combined with a color sensor 120 in the same semiconductor chip. With reference to FIG. 3, ToF pixels can be combined with color sensor pixels to form an image sensor 310 having distance measuring functionality. Each pixel in a cluster of pixels (e.g., group of four pixels 320, 330, 340 and 350) can be designed to perform a specific task. In FIG. 3, pixels 320, 330, and 340 are utilized to capture light from respective red (R), green (G), and blue (B) wavelength portions of the visible light portion of the electromagnetic spectrum. Pixel 350 is employed to operate as a ToF sensor. For example, in a chip comprising 24×100 pixels, the chip can be divided into four groups of 12×50 pixels having respective R, G, B color sensing and ToF determining functionality.

Figure 4:
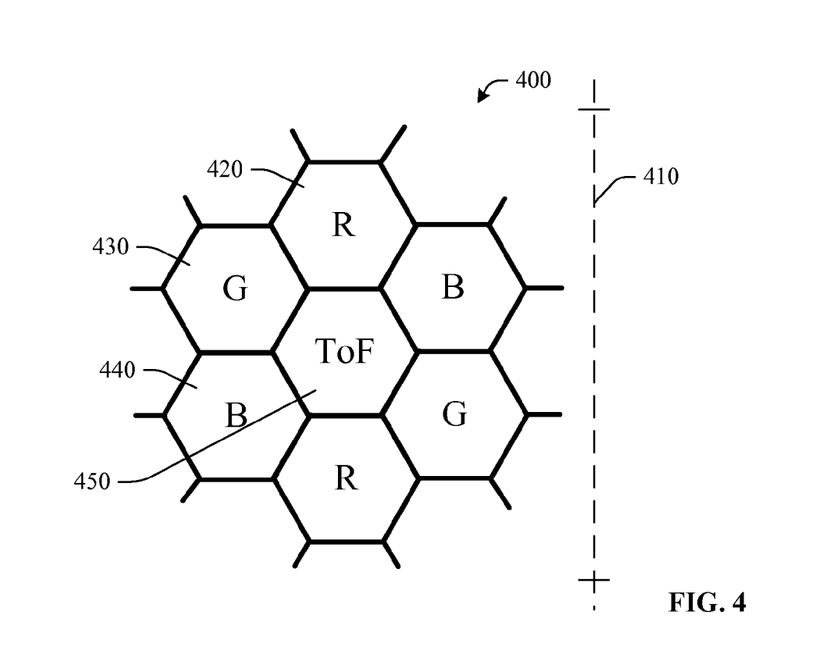
FIG. 4 illustrates an arrangement of pixels for color correcting an image based upon distance measurements provided by associated ToF sensor(s), in accordance with an aspect.

It is to be appreciated that while FIG. 3 shows pixel clustering having an RGB-d arrangement (where d is equivalent to the ToF pixel) the various aspects are not so limited, whereby any clustering of pixels can be utilized to facilitate suitable image capture by pixels performing capture of visible light along with requisite pixels having ToF capability. FIG. 4 illustrates an image sensor 410 comprising pixels 420-450 having an hexagonal profile and arranged in a honeycomb layout, where pixels 420, 430, and 440 are utilized to capture light from respective red (R), green (G), and blue (B) wavelength portions of the visible light portion of the electromagnetic spectrum. Pixel 450 is employed to operate as a ToF sensor.

Figure 5:
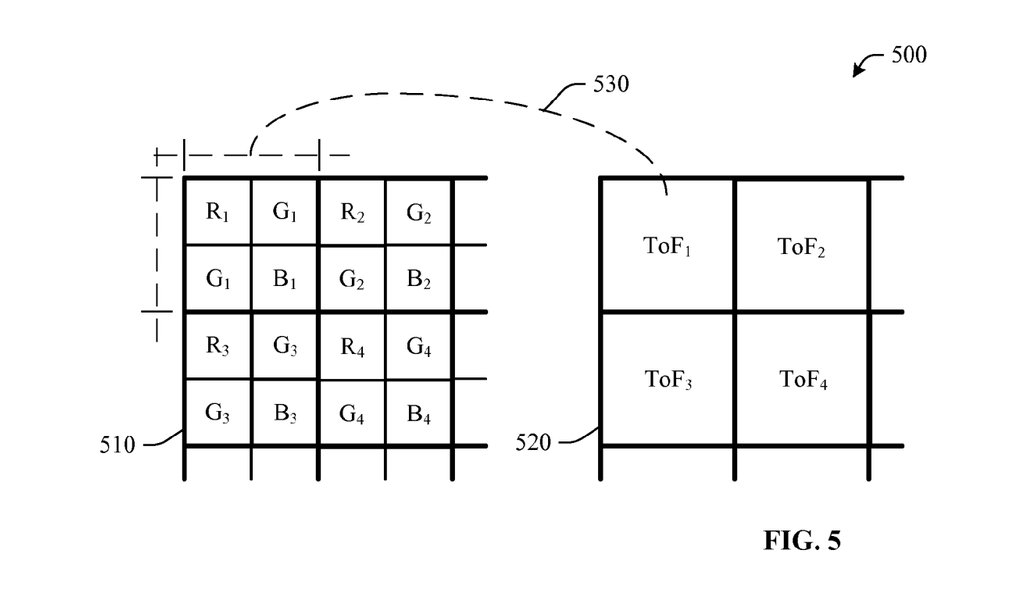
FIG. 5 illustrates an arrangement of pixels and associated ToF pixels(s) for color correcting an image based upon distance measurements provided by associated ToF sensor(s), in accordance with an aspect.

FIG. 5 presents system 500 comprising a color sensor 510 constructed separately from, but operating in conjunction with a ToF sensor 520. The pixels of color sensor 510 have been arranged in a Bayer GRGB layout, where each pixel cluster is operating in conjunction with an associated ToF sensor pixel. For example, the cluster of pixels $G_1R_1G_1B_1$ can be color corrected based upon distance measurements obtained from $ToF_1$ in the ToF sensor, pixel cluster $G_2R_2G_2B_2$ can be color corrected based upon $ToF_2$, and pixel cluster $G_3R_3G_3B_3$ can be color corrected based upon $ToF_3$, etc.

Further, as shown in FIG. 5 the size of a ToF pixel and a color pixel do not have to be of the same size, and accordingly, the ToF pixel and a color pixel do not have to have the same resolution. For image quality, typically the smaller the color pixels comprising color sensor 510 the better, but given that the ToF pixels are being employed to calibrate the color pixels (and readings from the color pixels), the size of the respective ToF pixels is not as critical as the color pixels as the ToF pixels may play no part in the actual image construction and resolution.

Figure 6:
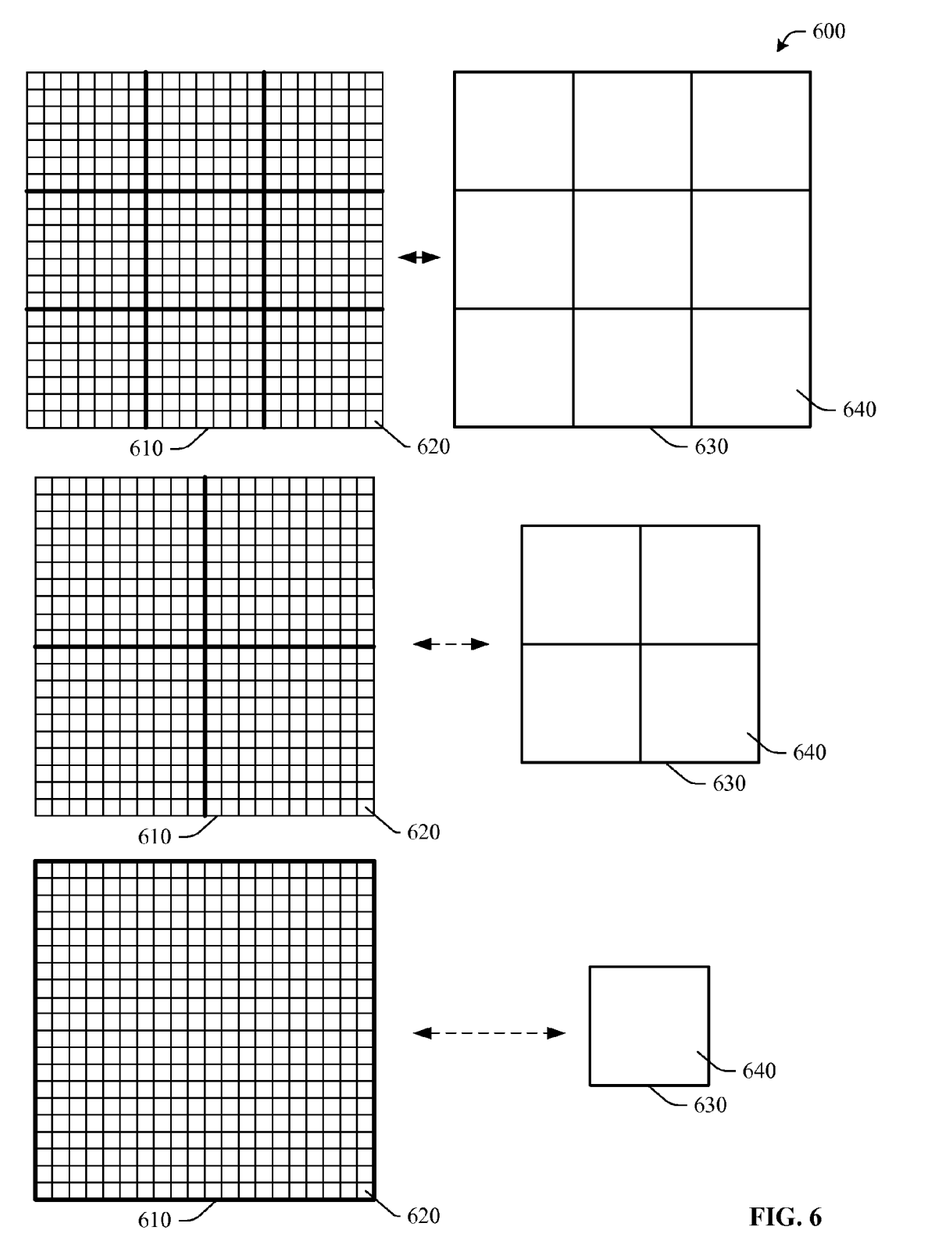
FIG. 6 illustrates a plurality of color sensor and associated ToF pixels(s) arrangements for color correcting an image based upon distance measurements provided by the associated ToF pixel(s), in accordance with an aspect.

FIG. 6, system 600, presents a plurality of color sensor and ToF pixel arrangements where a high resolution color sensor 610 comprises a plurality of color RGB pixels 620. The high resolution color sensor 610 can be coupled to a low resolution ToF chip 630. As shown in FIG. 6, low resolution ToF chip can comprise of one or more ToF pixels 640. In one aspect, a high resolution color sensor 610 (comprising a plurality of color RGB pixels 620) can be coupled to a low resolution ToF chip 630 comprising of a single ToF pixel 640 (as shown in FIG. 6, lower image). In another aspect, a high resolution color sensor 610 (comprising a plurality of color RGB pixels 620) can be coupled to a low resolution ToF chip 630 comprising a plurality of ToF pixels 640. As shown in the upper two embodiments (FIG. 6, middle and upper images), the high resolution color sensor 610 can be broken up into groupings of color RGB pixels 620 and distance determinations performed with respect to an associated ToF pixel 640. The various embodiments shown in FIG. 6 are suitable for measuring the distance of about planar surfaces, as well as finding application in a low cost system(s).

Figure 7:
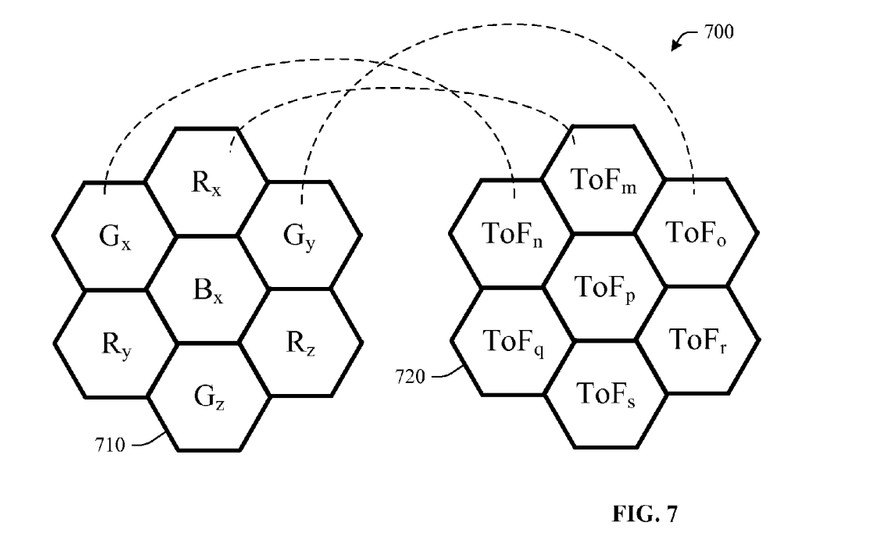
FIG. 7 illustrates an arrangement of pixels and associated ToF pixels(s) for color correcting an image based upon distance measurements provided by the associated ToF pixel(s), in accordance with an aspect.

FIG. 7 presents system 700 comprising color sensor 710 constructed separately from, but operating in conjunction with ToF sensor 720. The hexagonal pixels of color sensor 710 have been arranged in a honeycomb layout, where each pixel is operating in conjunction with an associated ToF sensor pixel. For example, pixel $R_x$ can be color corrected based upon distance measurements obtained from $TOF_m$ in the ToF sensor, with $G_x$ associated with $ToF_n$, $G_y$ associated with $ToF_o$, etc.

In an alternative aspect, rather than having pixels which operate in specific portions of the visible electromagnetic spectrum (e.g., R, G, or B), pixels operating across the visible portion of the electromagnetic spectrum can be employed. Alternatively, grayscale pixels can be employed where the pixel responds to the amount of incident light, for example, as the amount of incident light increases the greater the output voltage of the pixel. Further, in another embodiment, a filter can be placed over grayscale pixels whereby the filter is employed to filter respective portions of the electromagnetic spectrum while allowing a particular wavelength, plurality of wavelengths, or a range of wavelengths to pass through to the underlying grayscale pixels. Accordingly, where radiation source 150 comprises electromagnetic radiation having a range of wavelengths, e.g., visible light with wavelengths of about 390 to 750 nm, a filter can be employed to reduce the wavelength of light striking the color sensor, e.g., the filter is a "green light" filter and allows light having a wavelength of about 550 nm to pass through to the light sensor.

Figure 8:
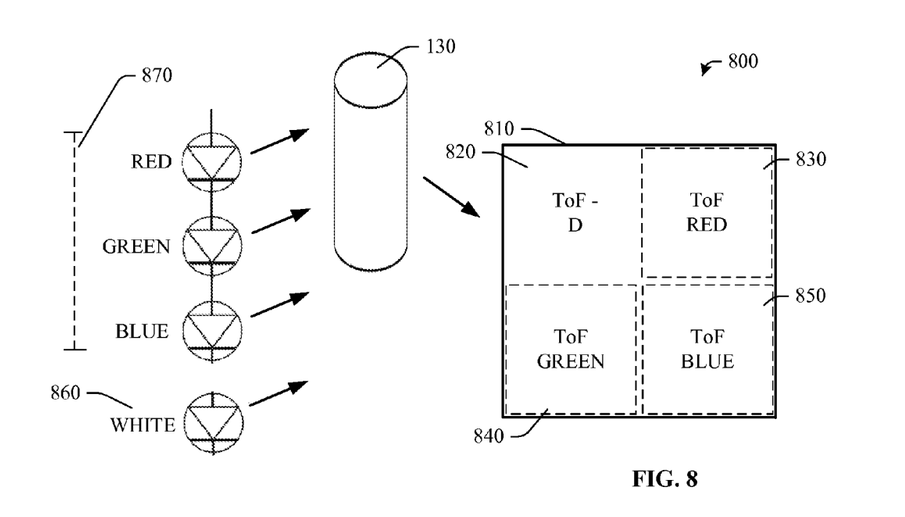
FIG. 8 illustrates a system for color image generation with a ToF sensor, in accordance with an aspect.

Current ToF sensors can operate using grayscale pixels. By employing color filters it is possible to create a ToF sensor having color sensing capabilities, thereby allowing a grayscale ToF sensor to generate 3D color images. FIG. 8 presents system 800 illustrating color filters being employed on a ToF sensor. Grayscale ToF sensor 810 can be divided into 4 regions, the first region functions as a ToF sensor 820 and is employed to determine a distance D from the ToF sensor 820 to an object (e.g., object 130). The second, third and fourth regions of grayscale ToF sensor 810 can be respectively covered with a red filter 830, green filter 840 or blue filter 850. Object 130 can be illuminated with a white-light source (e.g., a light emitting diode (LED) 860 producing white light) with the respective filter (e.g., filter 830, 840, 850) allowing a particular portion of the visible spectrum to be recorded at the underlying portion of grayscale ToF sensor 810. With the known distance measurement (as measured by ToF sensor 820), any required sensor calibration/adjustment based on the distance measurement, and the (as required) corrected color readings from the respective red, green and blue portions (e.g., 830, 840, 850) of the grayscale ToF sensor 810, a 3D color image can be compiled. Further, a white-light LED (e.g, LED 860) can be operating with a modulation suitable for distance measurement, e.g., about 20 MHz, or in an alternative embodiment illumination can be provided by red, green and blue LED's 870, illuminated in sequence with a frequency modulation of about 20 MHz.

In a further aspect, rather than the ToF sensor being responsive to electromagnetic radiation having an infrared wavelength, the ToF sensor can be responsive to one or more wavelengths in the visible portion of the electromagnetic spectrum. For example, with reference to FIG. 1, the ToF radiation source 140 can emit light from the red portion of the visible spectrum (e.g., light with a wavelength of about 650 nm). The red light would be received by imaging pixels (e.g., color sensor 120) responsive to light having a red wavelength, and the ToF sensor 110 can operate (as shown in FIG. 2) by determining the position of object 130 in accordance with the phase shift of the received red light.

In another embodiment, the effect of variation of an object surface can be compensated for. Rather than an object surface being planar, and typically orientated perpendicular to the image sensor, by employing a ToF sensor to determine viewing distance, an associated color pixel can be "calibrated" in accordance with the measured viewing distance. As described above, the color pixel can be calibrated based upon the distanced measured by the ToF sensor and any measurements made by the color sensor can be adjusted in accord with the calibration adjustment. The viewing distance of the color pixel can be automatically adjusted based upon the refresh rate of the ToF sensor.

It is to be appreciated that while the various aspects presented herein present color sensors comprising an RGB layout and a Bayer layout, the various aspects are not so limited and any suitable color sensor layout can be utilized. For example, the RGB layout and the Bayer layouts can be further complimented by red-green-blue-emerald (RGBE), cyan-yellow-yellow-magenta (CYYM), cyan-yellow-green-magenta (CYGM), and the like.

Turning to FIG. 9, system 900 is illustrated and comprises various components previously discussed, image sensor 100 comprising ToF sensor 110, color sensor 120, ToF radiation source 140, coupled to controller 160 which is further coupled to external device 170, etc. Further, system 900 includes a storage device 910 on which are stored one or more look up tables 920 and/or algorithms 930. A look up table 920 can provide correlation between a distance measurement and a degree of color correction to be applied to a reading received from color sensor 120 based upon a distance measurement received from ToF sensor 110. Similarly, a reading received from color sensor 120 can be "calibrated" with an algorithm 930 utilizing a distance measurement received from ToF sensor 110.

Figure 10:
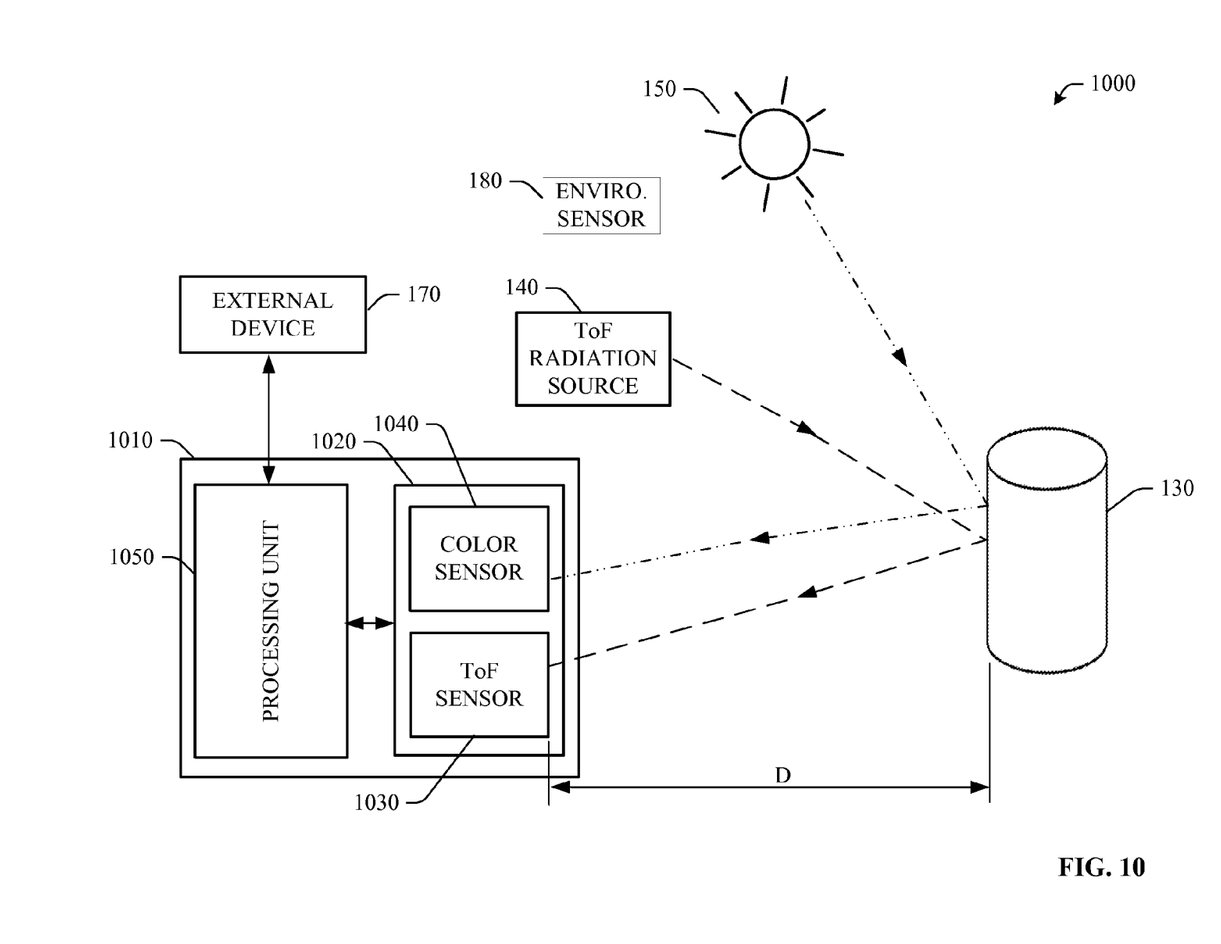
FIG. 10 illustrates a system for determining color-correction based upon object distance, in accordance with an aspect.

FIG. 10 illustrates system 1000 depicting a microcontroller/integrated circuit according to an aspect. System 1000 comprises a microcontroller/integrated circuit 1010 on which are combined a processing unit 1050 along with an image sensor 1020 comprising a ToF sensor 1030 and a color sensor 1040. As described previously, rather than various components being separately located, e.g., with reference to FIG. 1, image sensor 100 operating as a separate device to controller 160, the various components can be combined on a single device, e.g., microcontroller/integrated circuit 1010. Microcontroller/integrated circuit 1010 can be designed such that an image sensor 1020, comprising ToF sensor 1030 and color sensor 1040, resides on the same chip as an associated processing unit 1050. It is to be appreciated that image sensor 1020, ToF sensor 1030, color sensor 1040, and processing unit 1050, have the same functionality as that described earlier with reference to FIG. 1, and respective components image sensor 100, ToF sensor 110, color sensor 120, and controller 160. Further, while not shown, it is to be appreciated that ToF radiation source 140, radiation source 150, external device 170, and/or environmental sensor 180 can also be located on the microcontroller/integrated circuit 1010. It is to be further appreciated that ToF sensor 110 can be a color or grayscale ToF sensor.

Figure 11:
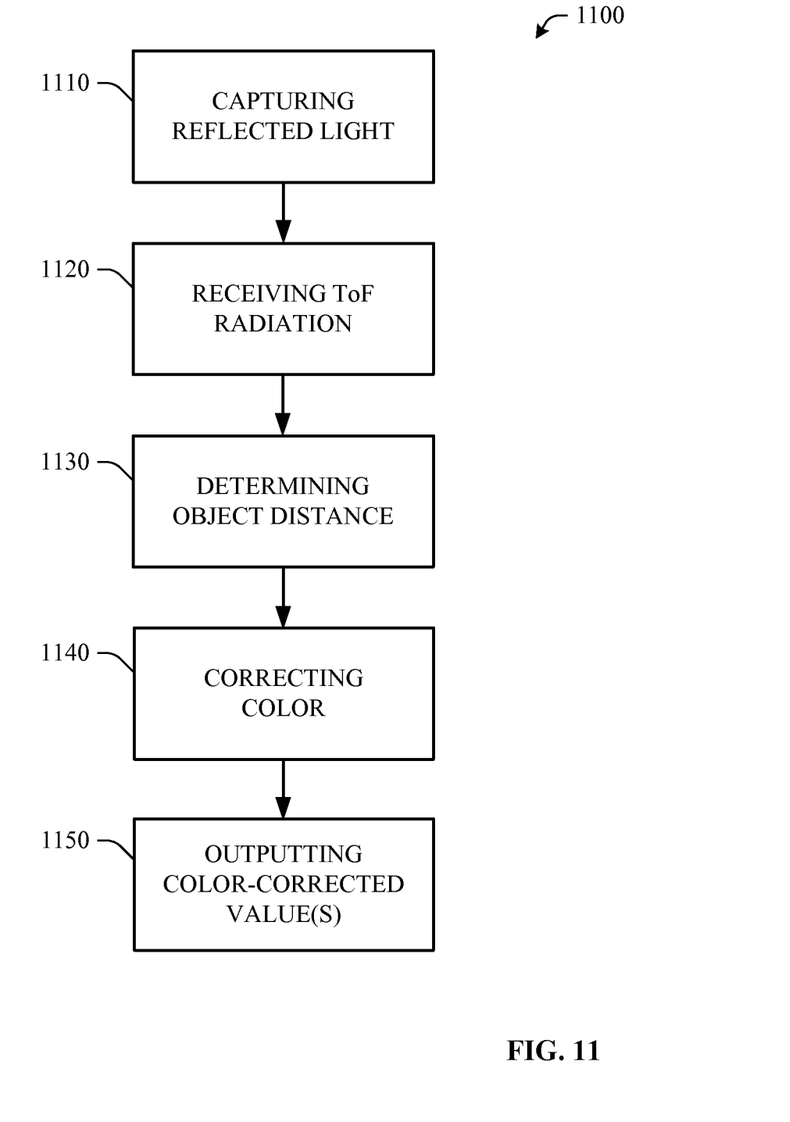
FIG. 11 illustrates an example methodology for determining color-correction based upon object distance, in accordance with an aspect.

FIG. 11 illustrates an example methodology 1100 for determining color correction based upon viewing distance. At 1110, light reflected from an object, e.g., object 130, is captured by one or more color pixels (e.g., color pixels 320-340, 420-440, $G_1R_1G_1B_1$, $R_{x-z}G_{x-z}B_x$, 1040, etc.) comprising one or more color sensors (e.g., image sensors 100, 710, 1010, and color sensors 120, 310, 410, 510, and 610, etc.).

At 1120 each color pixel has an associated ToF pixel (e.g., ToF pixels 350, 450, $ToF_1$, $TOF_{m-n}$, 1030, etc.) comprising one or more ToF sensors (e.g., image sensor 100 and sensors 310, 410, 520, and 620). Electromagnetic radiation reflected from the object is received at the ToF pixel.

At 1130 the distance from a particular ToF pixel to the object surface from which the ToF radiation was received from is determined (e.g., by controller 160, processing unit 1050, etc.). In one aspect, a ToF sensor determines distance based upon a phase shift between an emitted radiation transmitted from a radiation source to an object and the radiation received at a ToF pixel as reflected from the object. A phase shift of up to 360° can be determined, where 360° represents one wavelength of the radiation, 180° equals ½ wavelength, etc. Accordingly, by knowing the phase shift, the wavelength portion can be calculated and a distance with respect to wavelength portion can be determined. For an accurate determination to be obtained, the distance from a color pixel to the object should be about equal to the respective distance of a ToF pixel to the object (or a known distance ratio, e.g., 1:1, 1:2, 1:5, etc.), where the ToF pixel is being utilized to determine the distance of the particular color pixel to the object. In effect, the ToF pixel is being employed to determine a corresponding distance from a color pixel to an object to facilitate calibration of the color pixel.

At 1140 based upon the determined distance between the ToF pixel to the object, and accordingly the respective distance of the color pixel associated with the ToF pixel, the color reading obtained by the color pixel can be corrected in accordance with the determined distance (e.g., by controller 160). Any suitable method can be employed to perform the color correction. Suitable methods are, but not limited to, employing a look-up table (e.g., look-up table 920) comprising correlations between color reading(s), object to pixel distance(s), and correction factor(s) based thereon. Alternatively, an algorithm(s) (e.g., algorithm(s) 930) can be utilized into which a color reading and associated distance measurement are entered, correction factor(s) determined and a corrected color value generated.

At 1150 one or more color-corrected values can be outputted. The color-corrected values can be outputted to an external device (e.g., external device 170) for presentation, e.g., where the external device comprises means for display and the color corrected image can be presented thereon. Alternatively, the external device can comprise visual display means such as a printer and the color corrected image is generated in hard format. Further, the external device can comprise further means for data processing, where information associated with the color correction process (e.g., readings obtained by color pixels 320-340, 420-440, $G_1R_1G_1B_1$, $R_{x-z}G_{x-z}B_x$, 1040, etc.; readings obtained by image sensor 100, and ToF sensors 110, 310, 410, 520, 620 and 710; color corrected values as generated by look-up table(s) 820 and/or algorithm(s) 830; the look-up table(s) 820 and/or algorithm(s) 830 utilized to generate the color-corrected values; operating settings of the ToF radiation source 140; operating settings of radiation source 150, etc.) can be provided to the external device for subsequent processing.

It is to be appreciated that while methodology 1100 shows the process 1110 of capturing light reflected from an object, e.g., object 130, by one or more color pixels as an operation proceeding that of 1120 where radiation is received at one or more ToF pixels and at 1130 determining the object distance based upon the ToF data, the various aspects presented herein are not so limited and the operation of determining the object distance can be performed prior to capturing light by a color pixel and the operation 1140 of color correction performed thereafter.

It is to be further appreciated that while methodology 1100 discloses object to sensor distance being determined based upon determination of phase shift, other principles of ToF technologies are available, for example, pulse metering where a pulse is transmitted and the time-to-receive is measured.

Figure 12:
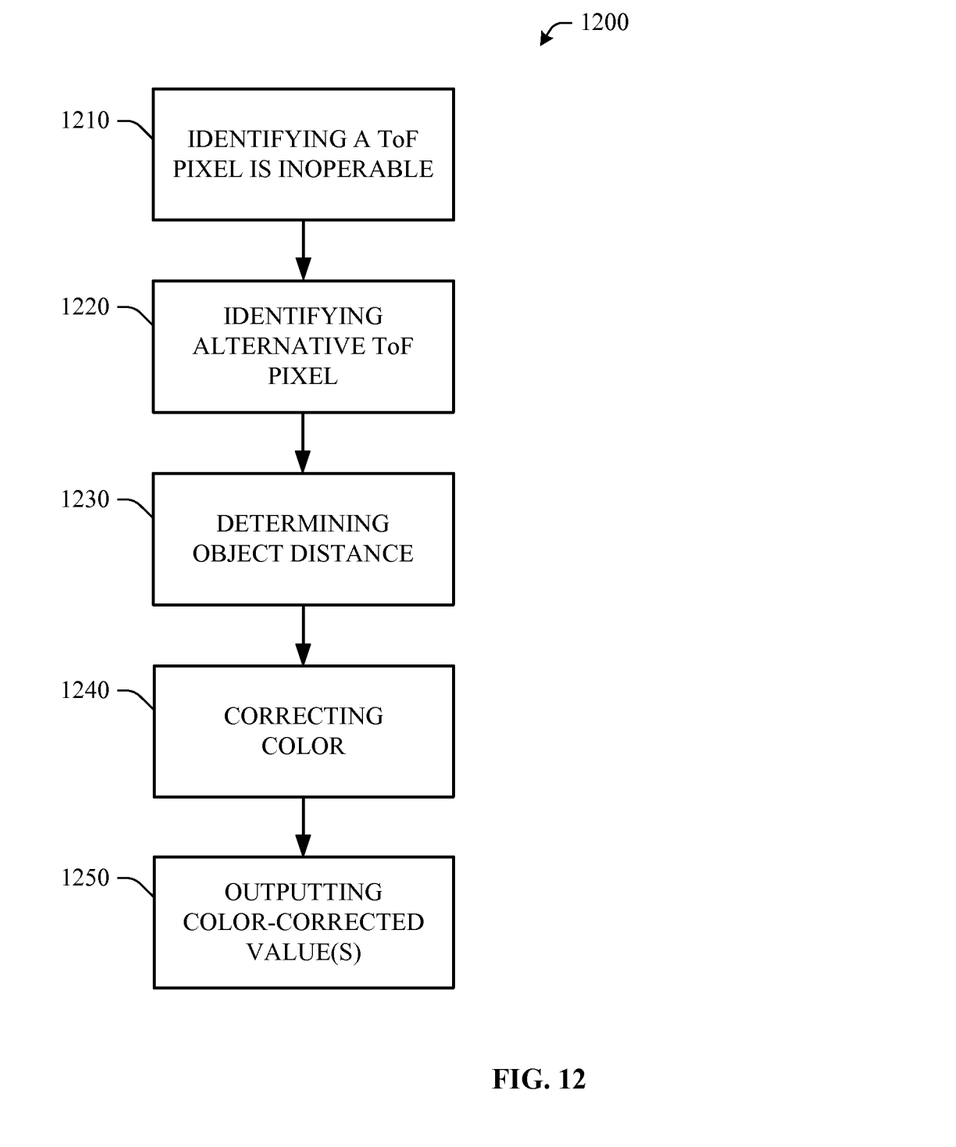
FIG. 12 illustrates an example methodology for identifying whether a ToF pixel is inoperable, in accordance with an aspect.

FIG. 12 illustrates an example methodology 1200 for correcting operation of a color sensing pixel where an associated ToF pixel is erroneous or inoperable. At 1210, during calibration of one or more color sensing pixels (e.g., color pixels 320-340, 420-440, $G_1R_1G_1B_1$, $R_{x-z}G_{x-z}B_x$, etc.) which comprise an image sensor (e.g., image sensor 100, 1020, and color sensors 120, 310, 410, 510, 610, 710, 810, 1040, etc.) improbable distance measurements or no measurements are obtained from a ToF pixel associated with the one or more color sensing pixels. As described supra, a color sensing pixel is calibrated based upon distance measurements received from a ToF pixel associated with the color pixel. However, a situation can arise where the ToF pixel is not functioning correctly. In one aspect, distance readings from two or more ToF pixels can be compared to determine whether a particular ToF pixel is generating a correct output. For example, two adjacent ToF pixels may be producing disparate readings, e.g., a first ToF pixel (e.g., FIG. 5, $ToF_1$) indicates an object is 7 m away, while a second ToF pixel (e.g., FIG. 5, $ToF_2$) indicates the object to be 1.5 m away. It is known that the object has a planar surface and is aligned perpendicular to the sightline of the ToF sensor. Accordingly, by comparing the distance values from the two ToF pixels it is possible to identify which ToF pixel is erroneous by comparing readings of adjacent ToF pixels (e.g., FIG. 5, $ToF_3$ or $ToF_4$). Alternatively, during an attempt to determine a degree with which a color sensing pixel is to be calibrated, during execution of the calibration determination (e.g., by controller 160) no readings are available from the ToF pixel associated with the color sensing pixel. Based on the above, it is considered that the ToF pixel is either providing erroneous values or is inoperable.

At 1220 a determination is made to identify an alternative ToF pixel which can provide readings to be employed in calibrating the subject color pixel. In one aspect where a ToF pixel is inoperable/erroneous (e.g., FIG. 5, $ToF_1$ is inoperable) readings are taken from an adjacent ToF pixel (e.g., FIG. 5, $ToF_2$, $ToF_3$ or $ToF_4$) which is performing correctly.

At 1230 the distance from the alternative ToF pixel to the object surface is determined (e.g., by controller 160, processing unit 1050).

At 1240 the alternative distance measurements are applied to the color sensing pixel. For example, the alternative distance measurement is referenced when determining a correction value from a lookup table (e.g., lookup table 920) associated with the color reading obtained from the subject color sensing pixel. In another example, the alternative distance measurement can be utilized when applying a calibration algorithm (e.g, algorithm 930) to calibrate the color reading obtained from the subject color sensing pixel.

At 1250 color corrected (e.g., calibrated) values for the subject color sensing pixel are outputted.

Figure 13:
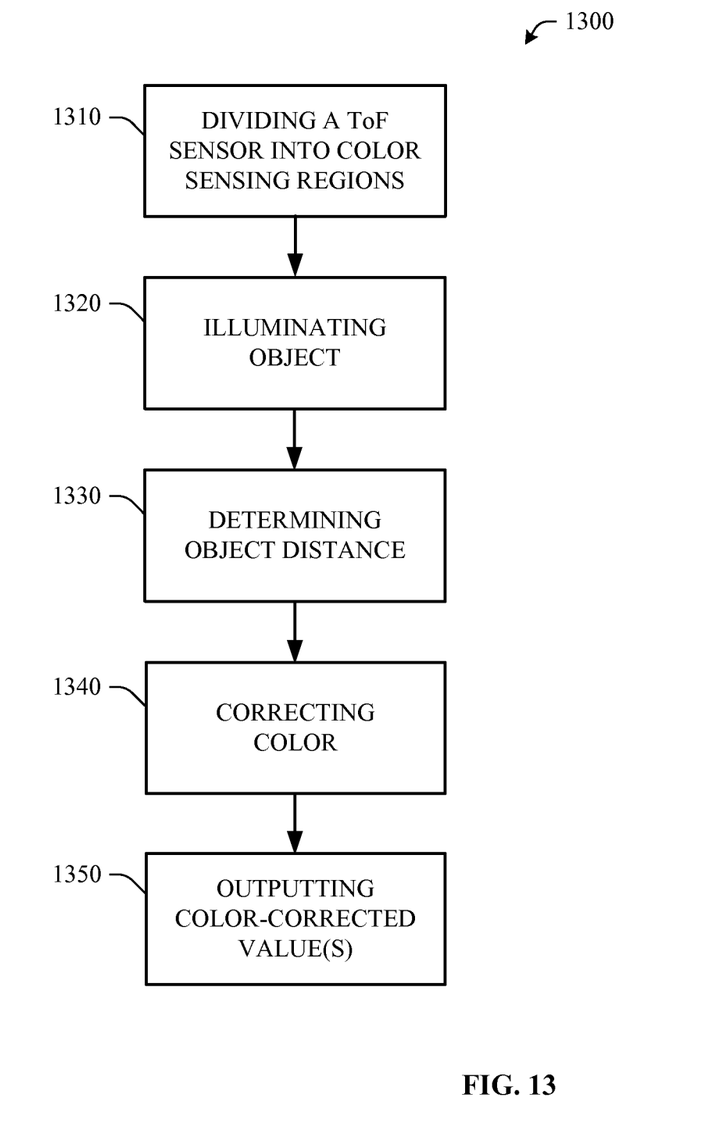
FIG. 13 illustrates an example methodology for generating a color image using a ToF sensor, in accordance with an aspect.

FIG. 1300 illustrates an example methodology 1300 for generating a color corrected image from a grayscale ToF sensor. At 1310 a grayscale ToF sensor (e.g., ToF sensor 810) is divided up into respective portions for performing viewing distance determination and color sensing. A ToF sensor, for viewing distance determination, may only operate in the infrared portion of the electromagnetic spectrum (as discussed supra). Further, as discussed above, a ToF sensor may only produce a grayscale 3D image. However, by employing color filters and appropriate illumination, a 3D color image can be produced. To facilitate distance measurement a portion of a ToF sensor is maintained as a pixel(s) region for measuring distance (e.g., ToF-d 820). Other portions of the ToF sensor can be covered with filters (e.g., ToF red filter 830, ToF green filter 840, ToF blue filter 850) to allow a desired portion of visible light to pass through to the ToF sensor pixel array below.

At 1320 an object (e.g., object 130) is illuminated. Illumination can be facilitated by any suitable illumination source (e.g., ToF radiation source 140, radiation source 150), where such illumination source can be an LED device, laser, etc. The LED device can comprise of a single LED emitting light across the visible portion of the electromagnetic spectrum (e.g., LED 860), where the LED device can operate with a frequency modulation suitable for ToF determination, e.g., about 20 MHz. In an alternative embodiment the LED device can comprise of a plurality of LEDs, where each LED emits light from different portions of the electromagnetic spectrum (e.g., red, green, and blue LEDs 870). The plurality of LED's can operate in sequence and with frequency modulation required for distance measurement, e.g., about 20 MHz.

At 1330, the distance of the object is determined based upon measurements obtained from the portion of the ToF sensor employed to facilitate distance measurement.

At 1340, based upon the determined object distance, the respective portions of the ToF sensor being employed to receive light reflected from the object and thereby create a 3D image of the object are calibrated. In accordance with the determined calibration(s) for each color sensing portion of the ToF sensor, the actual measurements received from each color sensing portion are adjusted. It is to be appreciated that the degree of calibration required for one color sensing region may not equal a degree of calibration required for another color sensing region. For example, the degree of color correction required to correct a red light reading may be greater than that required for a blue light reading, when both readings are made over the same distance.

At 1350 one or more color-corrected values can be combined and outputted. Values taken from each of the red, green, and blue light sensing portions of the ToF sensor can be combined to create a color image. Owing to the respective readings being accompanied by distance measurements it is possible to create a 3D color image. The color-corrected values can be output to an external device (e.g., external device 170) for presentation, printing, further data processing, etc.

For purposes of simplicity of explanation, methodologies that can be implemented in accordance with the various aspects disclosed herein were shown and described as a series of blocks. However, it is to be understood and appreciated that the various aspects disclosed herein are not limited by the order of the blocks, as some blocks can occur in different orders and/or concurrently with other blocks from what is depicted and described herein. Moreover, not all illustrated blocks are required to implement the methodologies described supra. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

Furthermore, the various aspects as presented herein can be implemented as a method, apparatus, or article of manufacture using standard programming and/or engineering techniques to produce software, firmware, hardware, or any combination thereof to control a computer to implement the various disclosed aspects. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
  a plurality of color sensing pixels that receive respective first electromagnetic radiation from an object and generate respective color indicating outputs based on the respective first electromagnetic radiation;
  a plurality of distance sensing pixels, respectively associated with one or more of the color sensing pixels, that receive respective second electromagnetic radiation from the object and generate respective distance indicating outputs based on the respective second electromagnetic radiation; and
  a controller that:
    determines respective distances from the respective color sensing pixels to the object based upon the respective distance indicating outputs of the respective distance sensing pixels associated with the respective color sensing pixels; and adjusts the respective color indicating outputs of the respective color sensing pixels based upon the respective distances from the respective color sensing pixels to the object.

2. The system of claim 1, wherein the plurality of distance sensing pixels are Time-of-Flight pixels.

3. The system of claim 1, wherein the respective first electromagnetic radiation is from the visible portion of the electromagnetic spectrum.

4. The system of claim 1, wherein the respective second electromagnetic radiation is from the infrared portion of the electromagnetic spectrum.

5. The system of claim 1, wherein there is a one to one association between color sensing pixels and distance sensing pixels.

6. The system of claim 1, wherein there is a many to one association between color sensing pixels and distance sensing pixels.

7. The system of claim 5, wherein an associated color sensing pixel and distance sensing pixel are functions of a common Time-of-Flight pixel.

8. The system of claim 1, wherein an associated color sensing pixel and distance sensing pixel reside on a single semiconductor.

9. A method for calibrating an image pixel, comprising:
    receiving, by a plurality of color sensing pixels, respective first electromagnetic radiation reflecting from an object;
    generating, by the plurality of color sensing pixels, respective color indicating outputs based on the respective first electromagnetic radiation;
    receiving, by a plurality of distance sensing pixels respectively associated with one or more of the color sensing pixels, respective second electromagnetic radiation reflecting from the object;
    generating, by the plurality of distance sensing pixels, respective distance indicating outputs, a second signal based on the respective second electromagnetic radiation;
    determining, by a device including a processor, respective distances from the respective color sensing pixels to the object based upon the respective distance indicating outputs of the respective distance sensing pixels associated with the respective color sensing pixels; and
    calibrating the respective color indicating outputs of the respective color sensing pixels based upon the respective distances from the respective color sensing pixels to the object.

10. The method of claim 9, wherein the respective first electromagnetic radiation is from the visible portion of the electromagnetic spectrum.

11. The method of claim 9, wherein the respective second electromagnetic radiation is from the infrared portion of the electromagnetic spectrum.

12. The method of claim 9, wherein the respective first electromagnetic radiation and the respective second electromagnetic radiation are from the same portion of the electromagnetic spectrum.

13. The method of claim 9, wherein an associated color sensing pixel and distance sensing pixel are functions of a common Time-of-Flight pixel.

14. A non-transitory computer-readable medium comprising computer-executable instructions that, in response to execution, cause a device including a processor to perform operations, comprising:
    receiving, by a plurality of color sensing pixels, respective first electromagnetic radiation reflecting from an object;
    generating, by the plurality of color sensing pixels, respective color indicating outputs based on the respective first electromagnetic radiation;
    receiving, by a plurality of distance sensing pixels respectively associated with one or more of the color sensing pixels, respective second electromagnetic radiation reflecting from the object;
    generating, by the plurality of distance sensing pixels, respective distance indicating outputs, a second signal based on the respective second electromagnetic radiation;
    determining, by a device including a processor, respective distances from the respective color sensing pixels to the object based upon the respective distance indicating outputs of the respective distance sensing pixels associated with the respective color sensing pixels; and
    calibrating the respective color indicating outputs of the respective color sensing pixels based upon the respective distances from the respective color sensing pixels to the object.

15. The non-transitory computer-readable medium of claim 14, wherein an associated color sensing pixel and distance sensing pixel are functions of a common Time-of-Flight pixel.

16. The non-transitory computer-readable medium of claim 14, wherein the respective distance sensing pixels are Time-of-Flight sensors.

17. The method of claim 9, wherein there is a one to one association between color sensing pixels and distance sensing pixels.

18. The method of claim 9, wherein there is a many to one association between color sensing pixels and distance sensing pixels.

19. The non-transitory computer-readable medium of claim 14, wherein there is a one to one association between color sensing pixels and distance sensing pixels.

20. The non-transitory computer-readable medium of claim 14, wherein there is a many to one association between color sensing pixels and distance sensing pixels.

* * * * *